July 1, 1941.　　　M. R. HUTCHISON, JR　　　2,247,500
SCREW DRIVER FOR SCREW STICKS
Filed Nov. 28, 1939
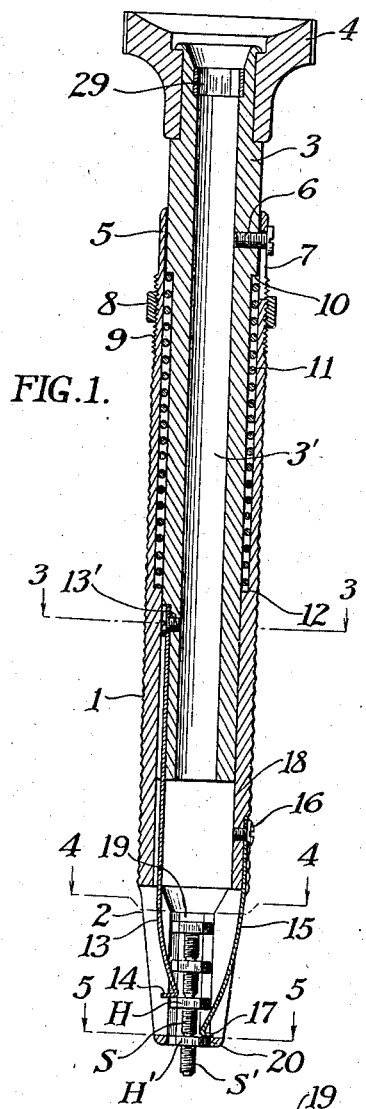
FIG. 1.
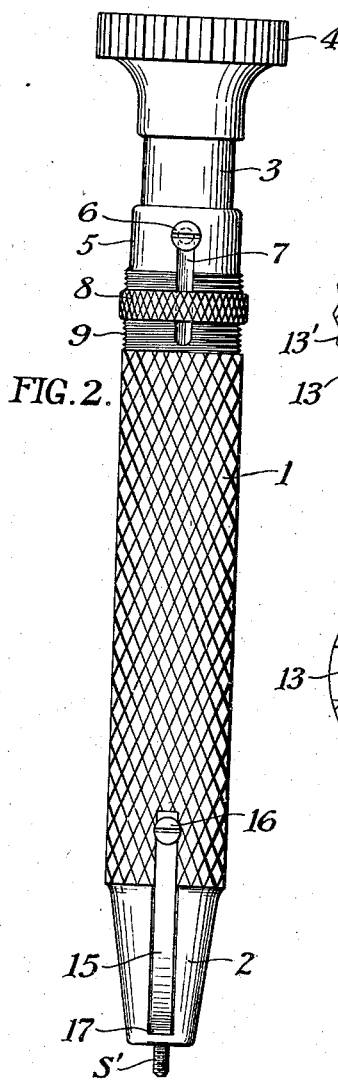
FIG. 2.
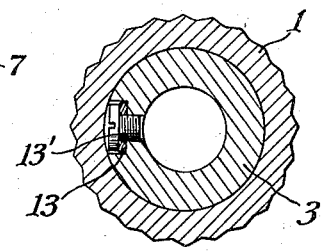
FIG. 3.
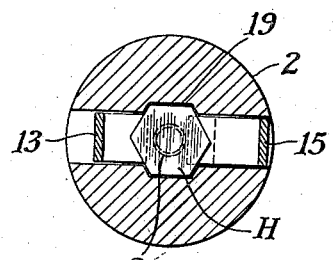
FIG. 4.
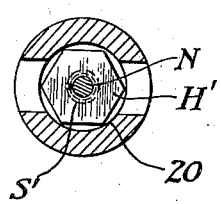
FIG. 5.
FIG. 6.
MILLER R. HUTCHISON, JR.
INVENTOR
BY
ATTORNEYS Patented July 1, 1941

2,247,500

UNITED STATES PATENT OFFICE 2,247,500

SCREW DRIVER FOR SCREW STICKS

Miller R. Hutchison, Jr., Rochester, N. Y., assignor to Eastman Kodak Company, Rochester, N. Y., a corporation of New Jersey Application November 28, 1939, Serial No. 306,505

6 Claims. (Cl. 145—50)

This invention relates to the application of screws to work. One object of my invention is to provide a means for driving screws in which the torque applied to the screw as it is being driven is limited to such an extent that it is impossible to strip the screw threads. Another object is to provide a screw driver which can not be separated from the screw until the screw is fully driven home. Still another object of my invention is to provide a means for driving one screw into the work by means of a second screw, and applying a driving torque to the second screw until a frangible portion between the two screws is broken. A still further object of my invention is to provide a magazine screw driver which is suitable for carrying out my method of applying screws to work. Another object is to provide a screw driver in which there is a means for drivingly engaging a screw removed from the screw being driven into the work and for guiding but not drivably engaging the screw being driven into the work. Still another object of my invention is to provide a means for advancing one screw after the other to the screw driving end of the screw driver, and other objects will appear from the following specification, the novel features being particularly pointed out in the claims at the end thereof.

Coming now to the drawing, wherein like reference characters denote like parts throughout:

Fig. 1 is a sectional view through a typical screw driver constructed in accordance with and embodying a preferred form of my invention.

Fig. 2 is a side elevation of the screw driver shown in Fig. 1.

Figs. 3, 4 and 5 are each cross-sections on lines 3—3, 4—4 and 5—5 of Fig. 1.

Fig. 6 is an enlarged detail section showing the screw driving end of my screw driver.

In applying screws, and particularly in applying small screws to tapped openings, there are a great many difficulties which consume considerable time and which, in many instances, require skill. For instance, when extremely small screws are being applied, such as are used in watches, photographic shutters and the like, considerable skill is required on the part of the operator to tighten the screw to the desired amount, without applying such torque to the screw as may strip the screw threads but sufficient to assure that the screw will hold properly. This cannot readily be done with small screws. Another difficulty is handling small screws, turning them until the screw slot engages the end of the normal type of screw driver, and positioning them in the work. Magnetic screw drivers afford some assistance, where they can be used, but even such screw drivers make it necessary to pick up and position the screws.

In accordance with my invention, I propose to utilize sticks of screws which may be successively advanced in a screw driver, or by other means, and to apply a torque to a screw other than the screw being driven into the work, so that a narrow, frangible neck connecting the driven screw to the driving screw will break when the screw being driven has been sufficiently tightened in its tapped hole. I propose to employ sticks of screws connected by narrow, frangible necks, the diameter and strength of which may be so regulated that two screws will break apart when the driven screw has been firmly seated in its aperture. Such screw sticks may be made of any length, and I have found that from 20 to 50 screws in a stick is suitable for most purposes, since such a stick can be inserted into a screw driver of convenient length for application to work.

Referring to Fig. 2, as an embodiment of a suitable type of screw driver, I have shown a screw driver comprising a hollow handle 1, having a screw driving end 2 and a screw advancing member 3, which preferably includes the usual type of rotatable knob 4. The screw advancing member 3 can slide in an upper hollow end 5 of the handle 1, its movement being limited by means of a screw 6 and a slot 7, the effective length of which can be altered by means of a collar 8, threaded at 9 to the handle 1. Thus, by moving the collar 8 back and forth, the extent of movement of the screw advancing member 3 can be controlled to an extent suitable to care for screws of varying lengths.

The screw advancing member 3 is provided with a shoulder 10, against which one end of a spring 11 rests, the other end of the spring resting against a shoulder 12 in the bore 5 of the handle. Thus, the screw advancing end 3 is normally held in the raised position shown in Fig. 1 so that an advancing spring 13 connected by a screw 13' to the tubular advancing member 3 can lie in the position shown in Fig. 1 with the flange 14 engaging the head H of a screw S, which is next adjacent a second screw S' which is being driven into the work.

A holding spring 15 is attached to the handle 1 by means of a screw 16, this holding spring having a shoulder 17 adapted to rest against the head H' of the screw being driven into the work.

Particular attention is called to the fact that in the present instance the heads H of the screws are hexagonal in shape and, as indicated in Fig. 4, the hollow portion 18 of the handle 1 has a complementary shaped hexagonal opening 19 in which the hexagonal heads H may slide freely, but in which they may not turn. Thus, when the handle 1 is turned, the heads H will be turned.

It should also be noticed that Fig. 5 provides a rounded opening 20 which does not engage the head H' of the lowermost screw S' to such an extent that it will rotate the head, although the edges of the head H' may, if desired, closely approach the bore 20 to be guided by this bore. Thus, the screw being applied to the work does not directly receive any driving force from the screw driving end 2 of the screw driver, but the screw is driven entirely through the next adjacent screw, the head of which engages the polygonal opening. Therefore, when a screw is turned into its tapped opening, the torque applied to the second screw will turn the driven screw until it is seated firmly and by continuing the turning movement and adding to it, if desired, a slight bending movement, the frangible neck N between the two screws is snapped off. Since the size of this neck has been carefully selected, so that the material will be of sufficient strength to firmly seat the driven screw and so that the neck will snap before the threads can be damaged by too great a torque, it will be seen that the proper seating of the screws does not solely depend upon the force applied to the screw driver.

For a full description of the screw sticks, reference may be had to my copending application Serial No. 306,504, filed November 28, 1939 and entitled "Screw stick."

After one screw has been driven into place, the operator merely presses down upon the knob 4, causing the screw advancing member 3 to lower the spring flange 14, shoving down the screw stick until the next screw is caught behind the holding spring 15. The operator then twists the screw driver rapidly until the screw is firmly seated in its tapped aperture and the neck N is twisted off. Thus, one screw after another may be applied at very high speed to the work without the necessity of picking up the individual screws, aligning the screw slots and screw driver, positioning the screws in the apertures, and, moreover, with my improved method of applying screws, it is impossible for a careless operator to apply too much or too little torque to a screw and thus strip the thread, sometimes damaging the work to such an extent that it can only be repaired at considerable expense.

While I have described the screw driver operating on hexagonal screw heads, it is obvious that various different shaped screw heads can be used, and a number of different preferred forms are shown in my copending application above referred to.

The shape of the screw driver, and particularly the shape of the screw driving end is, of course, made suitable for the shape of the screw heads of the screw stick being used. It is possible to drive in a smooth round screw head by providing a friction type of clutch inside of the screw driver and the screw driver, of course, may be made complemental in shape to any irregular size screw head which may be desired. Each type of screw head requires a special screw driver, although screws having threaded bodies of different lengths may be taken care of by adjusting the movement of the screw advancing mechanism by turning the knurled ring 8 on the thread 9, altering the possible throw of the screw advancing spring 13.

Referring to Fig. 1, it should be noticed that a small guiding sleeve 29, which is the same in cross-section as the opening 19 in the lower end of the screw driver, is provided in the upper end of the tubular member 3. The reason for this is that when a screw stick is loaded into the screw driver, the guiding sleeve 29 positions the heads of the screw stick properly so that they will immediately register with the opening 19, because the screw stick loaded into the screw driver is preferably at least as long as the distance between the guiding sleeve 29 and the operative end 20 of the screw driver.

From my copending application above referred to, it will be seen that some screw sticks may be provided with each side of the hexagonal heads of the screws lying in a single plane, whereas other screw sticks may have heads of different shapes, including round heads. In such cases, the screw driver must have an inside configuration which will drive the particular type of screw heads which are in use.

It is not essential that the screw driver be provided with the guiding sleeve 29, but I find that this facilitates loading the screw driver, particularly where the screw stick is not of greater length than the screw driver. Of course, if a screw stick is loaded into the screw driver which projects a distance from the knob 4, it may still be readily loaded by registering the lowermost screw by twisting the upper end of the screw stick.

After screws have been driven in with the screw driver as described above, it may be necessary to remove them. This can be done with a screw driver having an end opening complemental in shape to the screw head which is to be removed, so that it may be used to unscrew a seated screw or a screw which may have improperly entered the opening into which it was inserted.

One of the advantages of utilizing a screw stick for placing screws in work is that in some mechanisms containing many small parts, such as watches or photographic shutters, if individual screws are used, an operator is liable to drop a screw into the mechanism and it frequently occurs that if the mechanism is only partially assembled, it is extremely difficult to remove the dropped screw without taking the mechanism apart. My improved form of screw driver always holds onto the screw to be used until it is properly seated so that it is difficult, if not impossible, to accidentally drop a screw into mechanism being assembled.

When screws are used in a screw driver as described above, the last screw of each screw stick is ordinarily wasted because it is usual to drive each screw into the work through the driving contact with the next adjacent screw, or through driving contact with other screws of the stick.

What I claim is:

1. A screw driver for use with screw sticks composed of a plurality of coaxially arranged screws connected by frangible necks comprising a handle having a bore extending therethrough, a receptacle for a screw stick therein, a clearance section at the end of the bore in which a screw to be driven into the work may turn or slide, means in the handle bore spaced from said end a distance greater than the length of one screw head comprising walls for frictionally engaging a screw head and constituting a screw driving section, whereby an end screw of the screw stick may be applied to work by a screw head lying in the screw driving section and spaced from the end screw being driven into the work.

2. A screw driver for use with a stick of integral coaxially arranged screws connected by frangible necks comprising a hollow handle adapted to receive a stick of screws and having an end bore of a size to rotatably and slidably receive a screw head of the end screw of the stick and constituting a clearance section, a screw head driving section adjacent said clearance section and of a size and shape to drivingly engage a screw head, a screw advancer slidably mounted in the hollow handle, a screw holder connected to said advancer and resiliently movable into the path of screws in the hollow handle for holding the head of the end screw against movement into the driving section, whereby said driving section may be used to drive the end screw lying in the clearance section through an adjacent screw lying in the screw driving section until the frangible screw neck is twisted off by the torque applied to the handle, and means for positioning a screw in the screw driving position by sliding the screw advancer.

3. A screw driver for use with a stick of integral coaxially arranged screws connected by frangible necks comprising a hollow handle adapted to receive a stick of screws and having an end bore of a diameter to rotatably and slidably receive and enclose the screw head of the end screw of a stick and constituting a clearance section, a screw driving section adjacent the clearance section adapted to grip a screw head, a screw advancer slidably mounted in the hollow handle, a screw holder resiliently movable into the path of screws in the screw driving section of the hollow handle for engaging a screw spaced from the end screw lying in the clearance section of the hollow handle, whereby said handle may be used to drive the end screw through an adjacent screw until the frangible screw neck is twisted off by a torque applied to the handle, and means for positioning a screw in the screw driving position, by sliding the screw advancer, and means for regulating the stroke of the screw advancer to care for the length of the individual screw in use.

4. A screw driver for use with a stick of coaxially arranged screws each screw having a non-round head and each being connected to the adjacent screws by frangible necks, comprising a hollow handle adapted to receive said screw stick, a screw head clearance section at the extreme end of the hollow handle of a size to rotatably and slidably enclose the screw head of the end screw of the stick, a screw driving section adjacent the clearance section of the screw driver having an inside configuration substantially complemental to the shape of the screw heads and constituting a screw driving element, said screw driving element being spaced from the end of the screw driver by said clearance section, whereby said driving section may be spaced from a screw being driven into the work and lying partially in said clearance section, said driving section being of sufficient length to engage a screw head next adjacent the driven screw lying in the clearance section whereby a torque applied to a screw head in the screw driving section may drive the end screw solely through the frangible neck, and means inside the hollow handle for advancing and holding one screw at a time.

5. A screw driver for use with a stick of coaxially arranged screws each screw having a non-round head and each being connected to the adjacent screws by frangible necks, comprising a hollow handle adapted to receive said screw stick, said hollow handle having a screw guiding section at its extreme end and of a length and diameter to rotatably and slidably enclose a screw head, a screw driving section on the screw driver having an inside configuration substantially complemental to the shape of the screw heads constituting a driving element adjacent said screw guiding section, whereby said driving section may engage a screw adjacent the end screw of the stick being driven into the work, whereby a torque applied to a screw lying in the screw driving section may drive the end screw lying in the guiding section solely through the frangible neck, and means inside the hollow handle for advancing and holding one screw at a time, said advancing means comprising a slidably mounted sleeve, a spring arm carried thereby for engaging and moving a screw of the screw stick, and a spring normally holding the advancing means in a raised position whereby a single movement against spring pressure may advance the screw stick.

6. A screw driver for use with a stick of coaxially arranged screws each screw having a non-round head and each being connected to the adjacent screws by frangible necks, comprising a hollow handle adapted to receive said screw stick, a central bore at one end of said handle of a length not less than one screw head thickness forming a screw guiding section, a screw driving section on the screw driver having an inside configuration substantially complemental to the shape of the screw heads and constituting a driving element and lying adjacent the screw guiding section, said driving section being as long as the length of one screw whereby said driving element may engage a screw adjacent the end screw being driven into the work, whereby a torque applied to a screw lying in the driving section may drive the driven screw having a head lying in the guiding section solely through the frangible neck and means inside the hollow handle for advancing and holding one screw at a time, said advancing means comprising a slidably mounted sleeve, a spring arm carried thereby for engaging and moving a screw of the screw stick, and a spring normally holding the advancing means in a raised position whereby a single movement against spring pressure may advance the screw stick, means for limiting the sliding movement of the advancing means comprising a pin and slot on the advancing means and handle respectively, and a movable member carried by the handle and movable over the slot for adjusting the movement of the advancing member relative to the handle.

MILLER R. HUTCHISON, Jr.